United States Patent
Arasimowicz et al.

(10) Patent No.: US 10,671,757 B1
(45) Date of Patent: Jun. 2, 2020

(54) CONVERTING AN ALPHANUMERICAL CHARACTER STRING INTO A SIGNATURE

(71) Applicant: Allscripts Software, LLC, Raleigh, NC (US)

(72) Inventors: Brent Arasimowicz, Billerica, MA (US); Gordon Lyles Blackwell, Jr., Raleigh, NC (US); Michael Pastrone, Weston, MA (US)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 233 days.

(21) Appl. No.: 15/388,969

(22) Filed: Dec. 22, 2016

(51) Int. Cl.
*G06F 16/901* (2019.01)
*G06F 21/62* (2013.01)
*G06F 16/903* (2019.01)

(52) U.S. Cl.
CPC ...... *G06F 21/6254* (2013.01); *G06F 16/9017* (2019.01); *G06F 16/90344* (2019.01)

(58) Field of Classification Search
CPC ........... G06F 21/6254; G06F 17/30952; G06F 17/30985
USPC .......................................................... 726/26
See application file for complete search history.

(56) References Cited

U.S. PATENT DOCUMENTS

| | | | | |
|---|---|---|---|---|
| 7,219,088 B1* | 5/2007 | Li | ...................... | G06F 16/90344 |
| 9,442,980 B1* | 9/2016 | Trepetin | .............. | G06F 21/6254 |
| 2009/0322766 A1* | 12/2009 | Marien | ................. | G06F 21/606 |
| | | | | 345/520 |
| 2010/0302078 A1* | 12/2010 | Schuessler | ........... | G06K 7/0008 |
| | | | | 341/90 |
| 2013/0124474 A1* | 5/2013 | Anderson | ......... | G06F 17/30286 |
| | | | | 707/634 |
| 2014/0358965 A1* | 12/2014 | Sugiyama | ........... | G06F 15/8007 |
| | | | | 707/769 |
| 2015/0227690 A1* | 8/2015 | St. Jacques | ........... | G06F 19/328 |
| | | | | 705/3 |
| 2016/0062954 A1* | 3/2016 | Ruff | ........................ | G06F 17/21 |
| | | | | 715/249 |
| 2016/0321468 A1* | 11/2016 | Stankiewicz | ....... | G06F 21/6254 |

* cited by examiner

*Primary Examiner* — Eleni A Shiferaw
*Assistant Examiner* — Sakinah White Taylor
(74) *Attorney, Agent, or Firm* — Medley, Behrens & Lewis, LLC

(57) ABSTRACT

Technologies relating to converting an alphanumerical string that comprises personally identifying data (PID) into a signature for the string are described herein. The string is partitioned into several substrings, where each substring includes at least one character. For each substring, a sequence of bits that is uniquely mapped to the substring is retrieved from a mapping table. Thereafter, at least one bit is removed from each sequence of bits to create updated sequences of bits, and the updated sequences of bits are ordered based upon their values. For each updated sequence of bits, a substring that is uniquely mapped to the updated sequence of bits is retrieved from the mapping table. The retrieved substrings are concatenated in the order corresponding to the updated sequence of bits.

17 Claims, 9 Drawing Sheets

CONVERTING AN ALPHANUMERICAL CHARACTER STRING INTO A SIGNATURE

BACKGROUND

As more and more personal information about users is generated and stored in computer-readable data storage devices, protecting such information becomes increasingly important. In an example, retail establishments offer credit cards to their customers, wherein customers set forth personal information when applying for these cards. Exemplary personal information that may be set forth by a customer includes the full legal name of the customer, the Social Security Number (SSN) of the customer, a date of birth of the customer, a home address of the customer, and so forth. Oftentimes, this personal information is stored in a network-accessible database.

Conventionally, to protect a database that includes personal information, the database is encrypted so as to prevent unauthorized (malicious) entities from being able to access the personal information in the database. Briefly, an encryption system converts information in the database to ciphertext through utilization of a key, wherein the key is typically a password (or data that is based upon the password). The ciphertext is indecipherable; however, the ciphertext can be converted back to the original information through use of the encryption system and the key. While encryption systems are continuously improving (such that it is nearly impossible to break an encryption scheme without having knowledge of the key), a problem with conventional encryption-based approaches for protecting personal information is that malicious entities are often able to acquire a password that can be used to decrypt the ciphertext. There are numerous techniques currently employed by malicious entities to acquire passwords including, but not limited to, social engineering, phishing schemes, and the like. In some cases, once the malicious entity acquires a password for a database, the malicious entity can access an entirety (or a very large portion) of the database. Hence, the malicious entity can acquire personally identifying data (PID) for numerous users from the database.

In another example, a healthcare enterprise (e.g., a small office, a large enterprise, etc.) can use an electronic health record application (EHR) in connection with providing services to patients, wherein the EHR is configured to receive and store PID for patients of the healthcare enterprise. In a medical setting, PID for a patient can be a portion of protected health information (PHI) for the patient. Oftentimes, PID for a patient is retained in a database, wherein an encryption system encrypts information in the database to generate ciphertext. As noted above, however, a malicious entity may acquire a username and password by way of, for example, social engineering. Thus, the malicious entity can decrypt the ciphertext, extract PID therefrom, and sell such PID to nefarious users who use the PID to acquire credit in the name of the patient (or perform some other illegal activity).

SUMMARY

The following is a brief summary of subject matter that is described in greater detail herein. This summary is not intended to be limiting as to the scope of the claims.

Described herein are various technologies pertaining to converting an alphanumerical character string (which includes personally identifying data (PID), such as a name of a user, a Social Security Number (SSN) of the user, a date of birth of the user, a home address of the user, and/or the like) into a signature for the alphanumerical character string, wherein the signature uniquely represents the alphanumerical character string, and further wherein the alphanumerical character string is unable to be ascertained from the signature (i.e., the conversion from alphanumerical character string to signature is irreversible). Generation of the signature from the alphanumerical character string, however, is deterministic, in that each time the alphanumerical character string is presented for conversion, the same signature is generated. Therefore, if a database that includes the signature were acquired by a malicious entity, the malicious entity would be unable to ascertain the alphanumerical character string. In other words, the malicious entity would be unable to acquire the PID of the user. The signature, however, can be employed as an index for other information about the user who is represented by the signature. In a nonlimiting example, the technologies described herein are well-suited for use in a healthcare environment, wherein a signature for a patient indexes medical data for the patient, and further wherein the signature is generated based upon PID of the patient.

For example, a first time that a patient receives care at a healthcare facility (e.g., during a patient intake procedure), the patient can inform a healthcare worker of PID for the patient, and the healthcare worker can enter the PID into an electronic health record application (EHR) used by the healthcare facility in connection with providing care to patients. The PID can include, but is not limited to including, a name of the patient, a SSN of the patient, a date of birth of the patient, and the like. Different elements of the PID can be concatenated (such that whitespace is removed), and the (concatenated) PID can be or be included in an alphanumerical character string that is then converted into a signature. As indicated previously, and as will be described in greater detail below, conversion of the alphanumerical character string into the signature is deterministic, in that each time the alphanumerical character string (which comprises the PID for the patient) is presented for conversion, the same signature is generated.

After the signature is generated, the signature can be employed as an index to medical data about the patient (e.g., the medical data about the patient is directly or indirectly mapped to the signature). The PID of the patient can be destroyed responsive to the signature being generated, such that the PID is not retained in a database. Subsequently, when the patient returns for a follow-up appointment, the patient can again set forth his or her PID to a healthcare worker, and the healthcare worker can cause such PID to be provided to the EHR. The EHR (or application in communication with the EHR) converts the alphanumerical character string that includes the PID into the signature, and the medical data for the patient can be retrieved from a database based upon the signature. Thus, the EHR can return the medical data about the patient to the healthcare worker based upon the PID of the patient, while the database from which the medical data is retrieved does not store the PID of the patient.

A brief summary of conversion of an alphanumerical character string that comprises PID into a signature that represents the alphanumerical character string is now set forth. As indicated previously, the alphanumerical character string can include PID for the patient, where the PID for the patient is arranged in some known order (e.g., first name, last name, Social Security number) in the alphanumerical character string. A computing system receives the alphanumerical character string and partitions the alphanumerical string into a plurality of substrings, wherein numbers of alphanumerical characters in different substrings can be different. Thereafter, the computing system, for each substring, retrieves a sequence of bits that uniquely identifies the sub string from a mapping table. For instance, when one of the substrings is "AB", the computing system can retrieve the sequence of bits 0000111100001111 from the mapping table, wherein such sequence of bits uniquely identifies the substring "AB" in the mapping table. Subsequently, for each sequence of bits, the computing system removes at least one bit therefrom in accordance with a deterministic rule, thereby creating updated sequences of bits. An exemplary rule can be, for instance, "remove bit at position X, wherein position X is the position of the substring in the alphanumerical character string."

The computing system then orders the updated sequences of bits according to their values, and thereafter, for each updated sequence of bits, the computing system retrieves (from the mapping table) a second substring that is uniquely mapped to the updated sequence of bits in the mapping table. The computing system concatenates the substrings in the order that corresponds to the order of the updated sequences of bits, and the resultant concatenation of substrings is the signature for the originally provided alphanumerical character string.

To prevent dictionary attacks, wherein a malicious entity acquires the database and attempts to submit numerous guesses of alphanumerical character strings, multiple signatures can be created at the time of creation of the signature, wherein each signature in the multiple signatures can be created based upon PID for "fake" patients, where PID for a "fake" patient includes at least one of a name, social security number, or birthdate that does not correspond to a real patient of the healthcare facility. Therefore, if a malicious entity attempts to query the database by setting forth alphanumerical character strings that include guesses of PID, and a "hit" is returned based upon an alphanumerical character string, the malicious entity will not be able to ascertain whether the PID corresponds to a real or "fake" patient. Thus, only the person who already knows the PID for the patient can effectively query the database using the PID of the patient.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
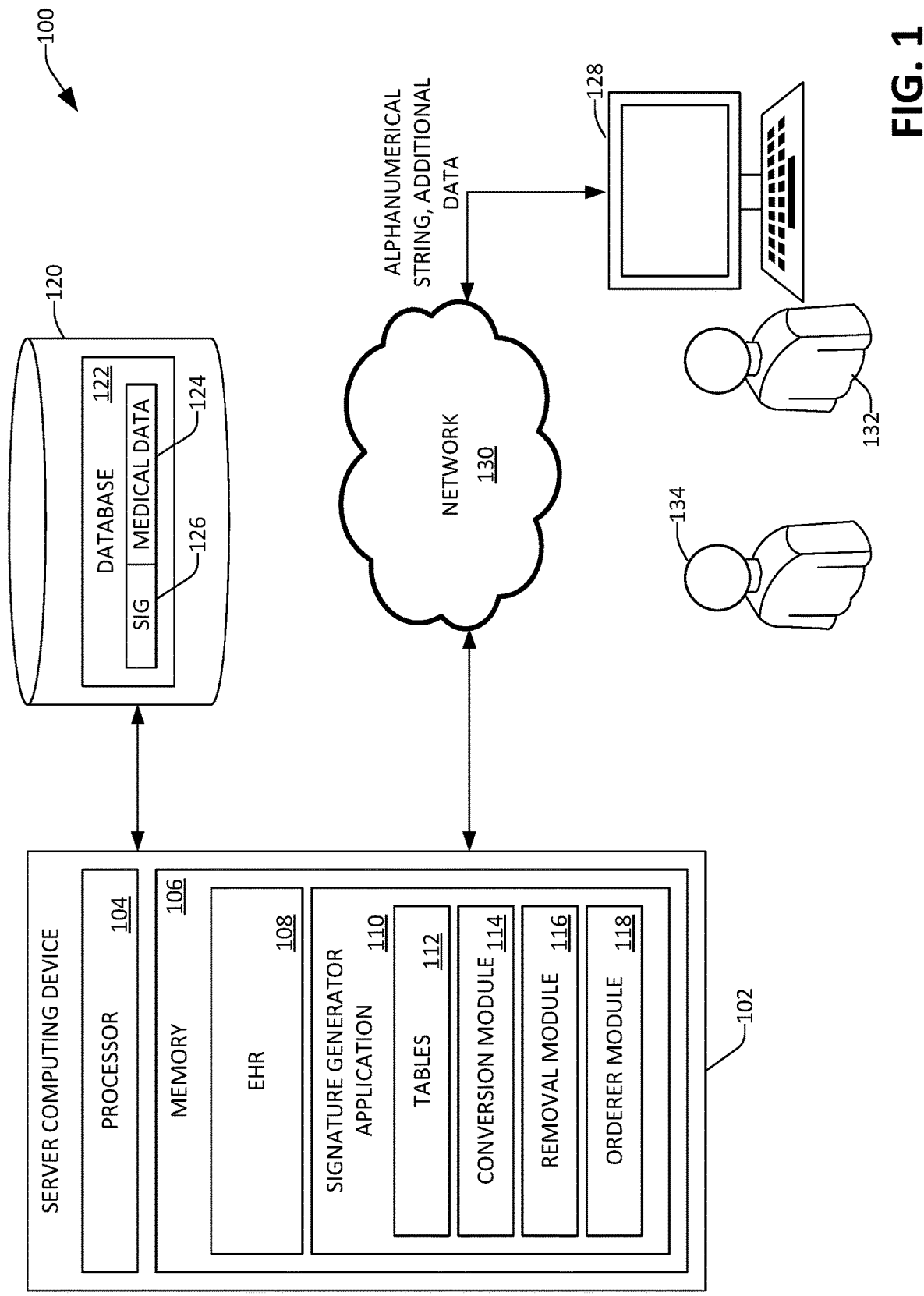
FIG. 1 is a schematic that illustrates an exemplary system for creating a signature for an alphanumerical character string.

Various technologies pertaining to converting an alphanumerical character string (which optionally comprises personally identifying data (PID) for an individual) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to converting an alphanumerical character string (which may include PID for an individual), wherein the resultant signature uniquely identifies the alphanumerical character string, and further wherein the conversion is irreversible, such that the alphanumerical character string cannot be derived from the signature. As will be described in greater detail below, the signature is generated by processing the alphanumerical character string using tables and deterministic rules, wherein even if a malicious entity were able to acquire the tables, the deterministic rules, and the signature, the malicious entity would be unable to derive the alphanumerical character string. Generation of the signature, however, is deterministic, such that the same signature is generated each time that the alphanumerical character string is presented for conversion. Accordingly, the signature for the alphanumerical character string can be used as an index in a database for other information about the individual, wherein the information about user is retrievable from the database based upon PID for the individual (which is always known to the individual). Hence, the technologies described herein offer improvements with storing PID, as well as with indexing data related to a person corresponding to the PID. The technologies described herein further provide for a more computationally efficient approach for obfuscating PID (or other data that is desirably obfuscated) when compared to conventional technologies, as conventional technologies require utilization of encryption algorithms, which consume more computational overhead than the one-way cipher approach described herein.

With reference now to FIG. 1, a schematic of an exemplary system 100 that is configured to convert an alphanumerical character string (which may include PID of an individual) to a signature that uniquely represents the alphanumerical character string is illustrated. As noted previously, and as will be described in greater detail below, the alphanumerical character string is converted to the signature using deterministic rules and tables, and the alphanumerical character string is unable to be derived from the signature. The system 100 comprises a server computing device 102 that includes a processor 104 and memory 106, wherein the memory 106 has instructions loaded therein that are executed by the processor 104. As shown, the memory 106 has an electronic health record application (EHR) 108 loaded therein, wherein the EHR 108 is configured to perform a variety of tasks associated with care of patients, wherein these tasks include, but are not limited to including, patient intake, patient billing, medication prescription, electronic record creation and maintenance, and the like.

The memory 106 also has loaded therein a signature generator application 110 that is configured to convert an alphanumerical character string (which may include PID) into a signature that uniquely represents the alphanumerical character string. As described in greater detail herein, the signature can be generated deterministically from the alphanumerical character string, but the alphanumerical character string is not derivable from the signature. As the signature generator application 110 deterministically generates the signature, the signature generator application 110 is configured to generate the same signature each time the same alphanumerical character string is presented for conversion. The signature generator application 110 converts alphanumerical character strings into signatures through use of tables (a partition table and a mapping table, which will be described below). More specifically, the signature generator application 110 comprises a conversion module 114 that is configured to convert the alphanumerical character string into a plurality of substrings through use of the partition table, and is then configured to identify respective sequences of bits that are uniquely mapped to the substrings from the mapping table.

The signature generator application 110 also includes a removal module 116 that (deterministically) removes at least one bit from each of the aforementioned sequences of bits, wherein the remaining bits (bits that are not removed) are left in their original order. Accordingly, the removal module 116 converts the sequences of bits (that represent the substrings in the alphanumerical character string) to updated sequences of bits. The signature generator application 110 also comprises an orderer module 118 that orders the updated sequences of bits according to their respective values. The orderer module 118 then retrieves, from the mapping table in the tables 112, substrings that are uniquely mapped to the updated sequences of bits in the mapping table, thereby forming an updated alphanumerical character string (which includes the ordered sub strings). The signature generator application 110 outputs the updated alphanumerical character string as the signature for the alphanumerical character string.

The system 100 also comprise a data store 120 that is accessible to the server computing device 102. The data store 120 comprises a database 122, which includes medical data 124 that is mapped to a signature 126 generated by the signature generator application 110. It can therefore be ascertained that the medical data 124 corresponding to the signature 126 can be retrieved from the database 122 based upon the PID, as the PID is used to create the signature 126.

The system 100 can also include a client computing device 128 that is in communication with the server computing device 102 by way of a network 130. While the client computing device 128 is illustrated as being a desktop computing device, it is to be understood that the client computing device 128 may be any suitable type of computing device. Thus, the client computing device 128 can be, but is not limited to being, a mobile telephone, a tablet computing device, a laptop computing device, a desktop computing device, a wearable computing device, etc. The client computing device 128 is operated by a healthcare worker 132, wherein the client computing device 128 transmits data to the server computing device 102 and retrieves data from the server computing device 102 based upon input from the healthcare worker 132.

While the system 100 has been described as having the architecture set forth in FIG. 1, it is to be understood that other architectures are contemplated, and are intended to fall within the scope of the hereto-appended claims. In an example, the EHR 108 and the signature generator application 110 may be provided as hosted services for a healthcare enterprise (e.g., the EHR 108 and the signature generator application 110 can be provided as "cloud services" to a healthcare enterprise). Thus, the server computing device 102 is not owned or maintained by the healthcare enterprise. In another example, the server computing device 102 may be owned and maintained by the healthcare enterprise. In still yet another example, the EHR 108 and the signature generator application 110 may execute on separate server computing devices at different locations. For instance, the EHR 108 may execute on a first server computing device owned and operated by the healthcare enterprise, while the signature generator application 110 may execute on a second server computing device (e.g., where the signature generator application 110 and the database 122 are provided as a "cloud service"). In such an example, the second server computing device (not shown) is in network communication with the data storage device 120.

Operation of the system 100 is now described with reference to FIGS. 1-5. Referring initially to FIG. 1, in an example, a patient 134 enters a healthcare facility for the first time, wherein the patient 134 intends to receive care. The patient 134 is greeted by the healthcare worker 132; because the patient 134 has not been to the healthcare facility before, the patient 134 provides information about himself or herself to the healthcare worker 132. This information can include PID, such as the first name and last name of the patient 134, the SSN of the patient 134, the date of birth the patient 134, the home address of the patient 134, and so forth. The client computing device 128 receives input from the healthcare worker 132 (e.g., to create a new record for the patient 134), wherein the input comprises the PID for the patient 134. The input can also comprise other information about the patient 134, including reason of the visit, symptoms exhibited by the patient 134, medications being prescribed to the patient 134, and so forth. The client computing device 128, responsive to receiving this input, transmits an alphanumerical character string and additional data to the server computing device 102. The alphanumerical character string includes at least some of the PID. In the example set forth herein, the alphanumerical character string consists of a first name and last name of the patient 134 ("John Smith"). It is to be understood, however, that the alphanumerical character string may include other or additional PID for the patient 134. The additional data can include the symptoms of the patient, medical history for the patient, and so forth.

The server computing device 102 receives the alphanumerical character string and the additional data, and directs the alphanumerical character string and the additional data to the EHR 108. The EHR 108, responsive to receiving the alphanumerical character string, initiates a record creation protocol, wherein the record creation protocol includes indexing the additional data about the patient 134 with a signature. Thus, responsive to receiving the alphanumerical character string, the EHR 108 provides the alphanumerical character string to the signature generator application 110 which, as described above, converts the alphanumerical character string into a signature that uniquely represents the alphanumerical character string.

Figure 2:
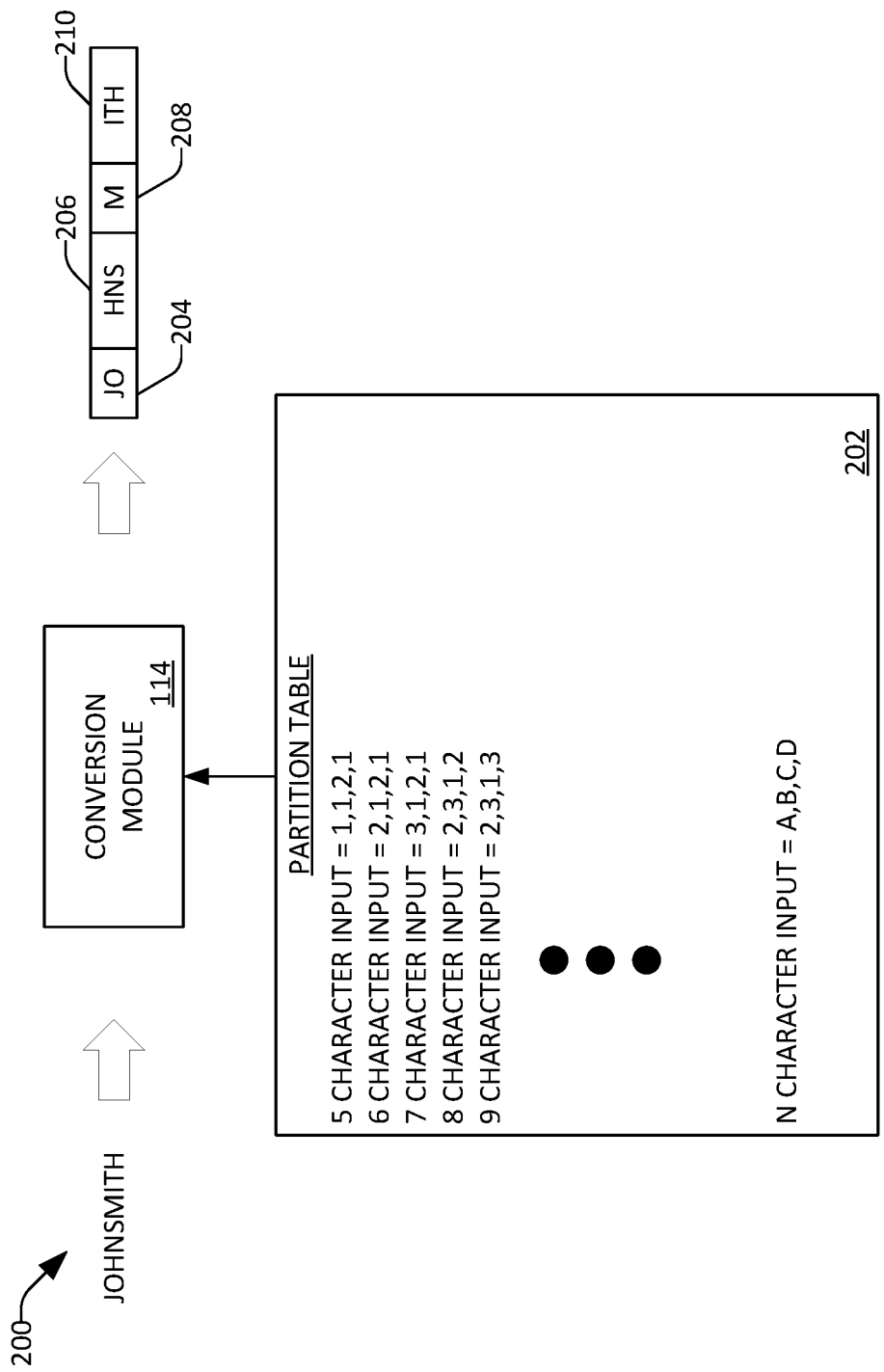
FIG. 2 is a schematic that illustrates a conversion module that is configured to partition an alphanumerical character string into a plurality of substrings.

Referring now to FIG. 2, a schematic that depicts operation of the conversion module 114 is illustrated. With more particularity, the conversion module 114 of the signature generator application 110 receives the alphanumerical character string 200 "JOHNSMITH". If not already concatenated (e.g., by the EHR 108 or the client computing device 128), the conversion module 114 can remove any whitespace in the alphanumerical character string 200 and concatenate the alphanumerical characters. The conversion module 114 then partitions the alphanumerical character string into a plurality of substrings 204-210. In an example, the conversion module 114 can identify a number of characters in the alphanumerical character string 200 and then ascertain how to partition the alphanumerical character string 200 based upon an appropriate partition rule in a partition table 202 (in the tables 112). For instance, as shown in the partition table 202, when an alphanumerical character string has five characters, the conversion module 114 can partition the five character alphanumerical character string into four substrings, with numbers of characters in the substrings being 1, 1, 2, and 1, respectively.

In the example of "JOHNSMITH", such alphanumerical character string 200 consists of nine alphanumerical characters. Accordingly, the partition rule in the partition table 202 for 9 character alphanumerical character strings indicates that the conversion module 114 is to partition the alphanumerical character string 200 "JOHNSMITH" into four substrings, where the numbers of characters in the substrings are 2, 3, 1, and 3, respectively. Thus, the conversion module 114 partitions the alphanumerical character string 200 "JOHNSMITH" into the substrings 204-210 consisting of characters "JO", "HNS", "M", and "ITH", respectively. It can be ascertained that different substrings can consist of different numbers of characters. More specifically, as shown, the substring 204 consists of two characters, the substring 206 consists of three characters, and the substring 208 consists of one character. In other contemplated embodiments, however, each substring can consist of a same number of characters (i.e., the alphanumerical character string 200 may be partitioned into 9 substrings, with each substring consisting of a single character).

Figure 3:
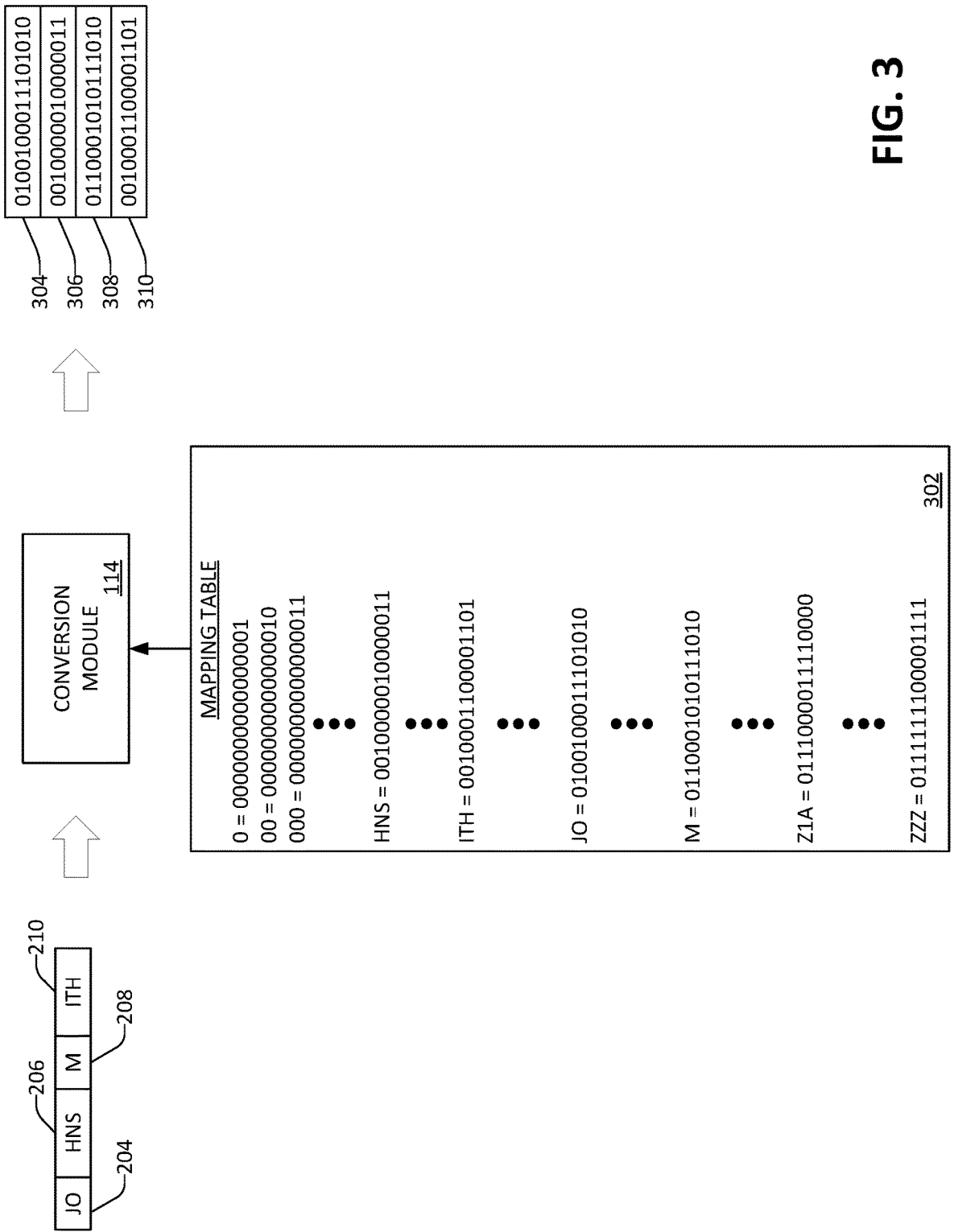
FIG. 3 is a schematic that illustrates that the conversion module is further configured to retrieve sequences of bits that are uniquely mapped to substrings of an alphanumerical character string.

Now referring to FIG. 3, a schematic that illustrates further operation of the conversion module 114 is depicted. For each substring in the multiple substrings 204-210, the conversion module 114 searches a mapping table 302 (from the tables 112) for a bit sequence that is uniquely mapped to the substring. In other words, in the mapping table 302, substrings are mapped to bit sequences that uniquely represent the substrings. In the exemplary table 302, each substring is uniquely mapped to a 16-bit sequence of bits, although other numbers of bits are contemplated. The conversion module 114 searches the mapping table 302 using the substrings 204-210, and retrieves sequences of bits 304-310 from the mapping table 302 that are respectively mapped to the substrings 204-210 in the mapping table 302. Therefore, as depicted in FIG. 3, for the substring 204 "JO", the conversion module 114 retrieves the sequence of bits 0100100011101010 from the mapping table 302, for the substring 206 "HNS", the conversion module 114 retrieves the sequence of bits 0010000010000011, and so forth. It is to be understood that the mapping table 302 need not map substrings to sequences of bits in any particular order; all that is required is that substrings and sequences of bits are uniquely mapped to one another.

Figure 4:
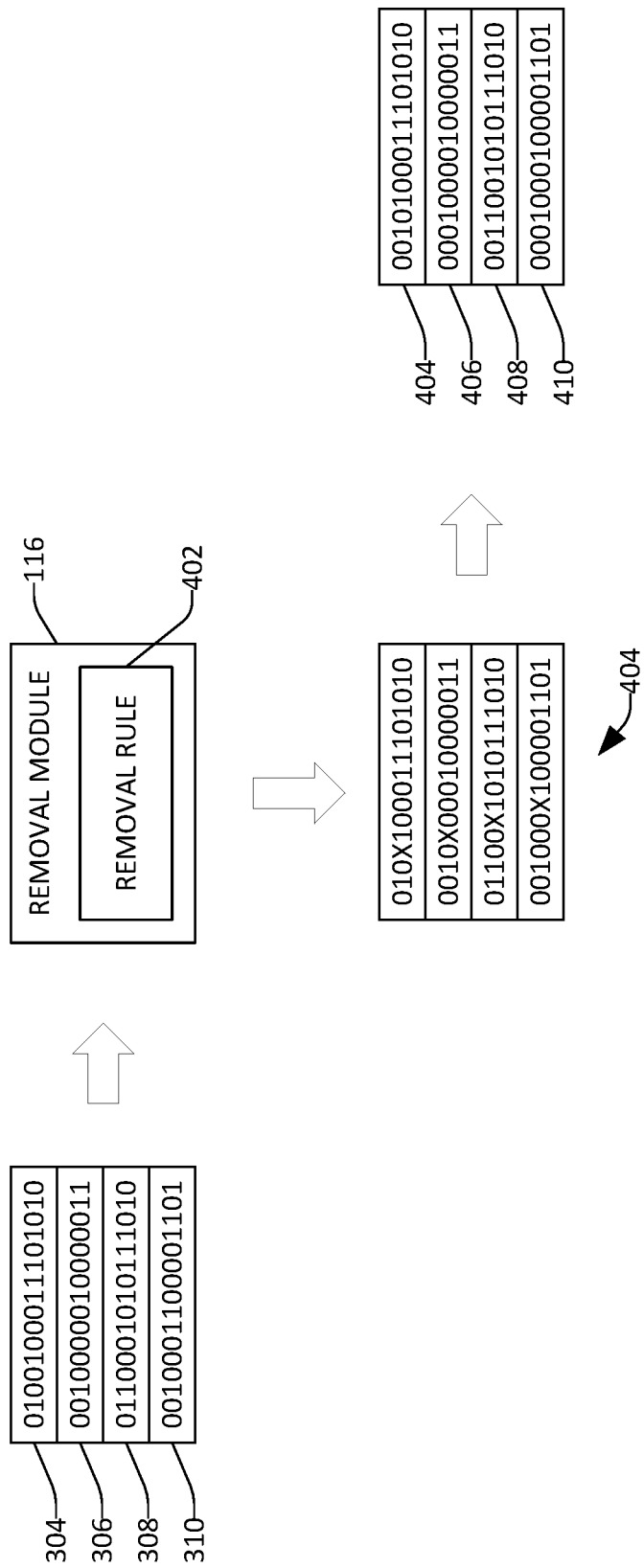
FIG. 4 is a schematic that depicts a removal module that is configured to remove at least one bit from a sequence of bits through application of a removal rule.

FIG. 4 is a schematic that illustrates operation of the removal module 116. The removal module 116 receives the sequences of bits 304-310 that represent the substrings 204-210 of the alphanumerical character string 200. The removal module 116 employs a removal rule 402 to remove at least one bit from each sequence of bits in the sequences of bits 304-310. The removal rule 402 can be any suitable deterministic rule. As shown in the example depicted in FIG. 4, the removal rule 402 can indicate that a fourth most significant bit in the first sequence of bits 304 is to be removed, that a fifth most significant bit in the second sequence of bits 306 is to be removed, and so forth (as shown with respect to the sequences of bits 403, where "Xs" are presented where the bits have been removed).

By removing at least one bit from each sequence of bits in the sequences of bits 304-310, the removal module 116 generates updated sequences of bits 404-410 that correspond to the sequences of bits 304-310. As depicted in FIG. 4, other than the at least one removed bit, the order of the bits in the updated sequences of bits 404-410 is the same order found in the sequences of bits 304-310. Thus, in the example depicted in FIG. 4, the removal module converts the sequence of bits 304 (which represents the substring "JO") 0100100011101010 to the sequence of bits 404 010100011101010. Hence, the 16-bit bit sequence of bits 304 is changed to a 15-bit bit sequence. In the example depicted in FIG. 4, the removal module 116 can prepend a 0 to each updated sequence of bits, such that the updated sequences of bits 404-410 are 16-bit sequences. It can be ascertained from the foregoing that the updated sequences of bits 404-410 have different values when compared to the sequences of bits 304-310.

Figure 5:
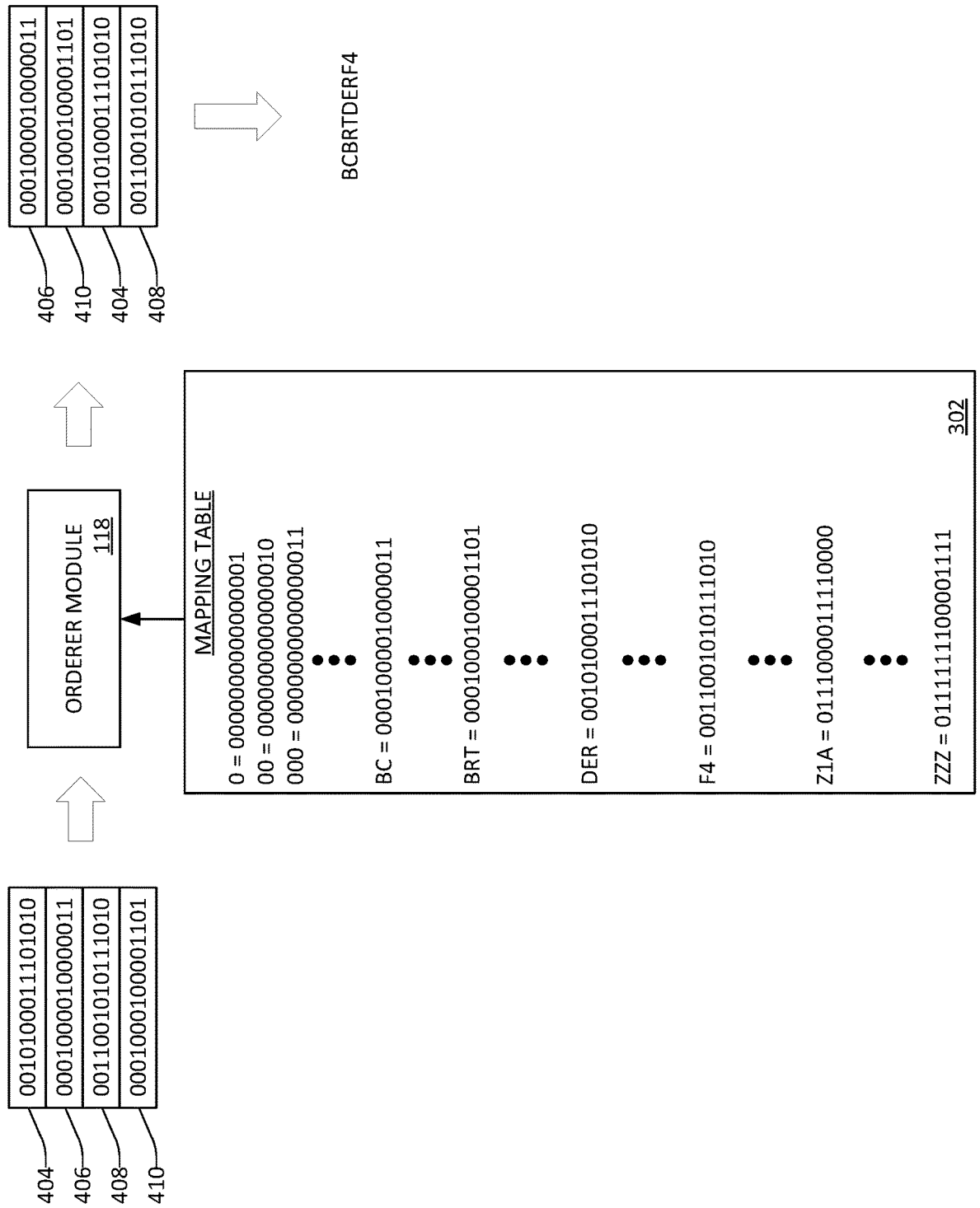
FIG. 5 is a schematic that depicts an orderer module that is configured to order sequences of bits according to their values.

Now turning to FIG. 5, a schematic 500 that depicts operation of the orderer module 118 is illustrated. The orderer module 118 receives the sequences of bits 404-410, and then orders the sequences of bits 404-410 based upon their values. Thus, rather than the sequences of bits being ordered 404, 406, 408, 410, the orderer module 118 places the sequences of bits in the order 406, 410, 404, 408 based upon their values, with the lowest value being first. It is to be understood, however, that the orderer module 118 can order the sequences of bits 404-410 from highest to lowest or other suitable order.

Responsive to the orderer module 118 ordering the sequences of bits 404-410, the orderer module 118 searches the mapping table 302 for substrings that are uniquely mapped to the sequences of bits 404-410. For instance, the sequence of bits 406 (0001000010000011) is mapped to the substring "BC" in the mapping table 302, the sequence of bits 410 (0001000100001101) is mapped to the substring "BRT" in the mapping table, the sequence of bits 404 (0010100011101010) is mapped to the substring "DER" in the mapping table 302, and the sequence of bits 408 (0011001010111010) is mapped to the substring "F4" in the mapping table 302. The orderer module 118 accordingly can output the alphanumerical character string "BCBRT-DERF4" as the signature for the input alphanumeric character string 200 "JOHNSMITH". In an example, the orderer module 118 can be configured to require all signatures generated thereby to be of equivalent length. In a nonlimiting example, each signature may be required to consist of 12 characters. The orderer module 118 can deterministically append characters to the end of the output signature, thereby forming a final signature for the alphanumerical character string.

Figure 6:
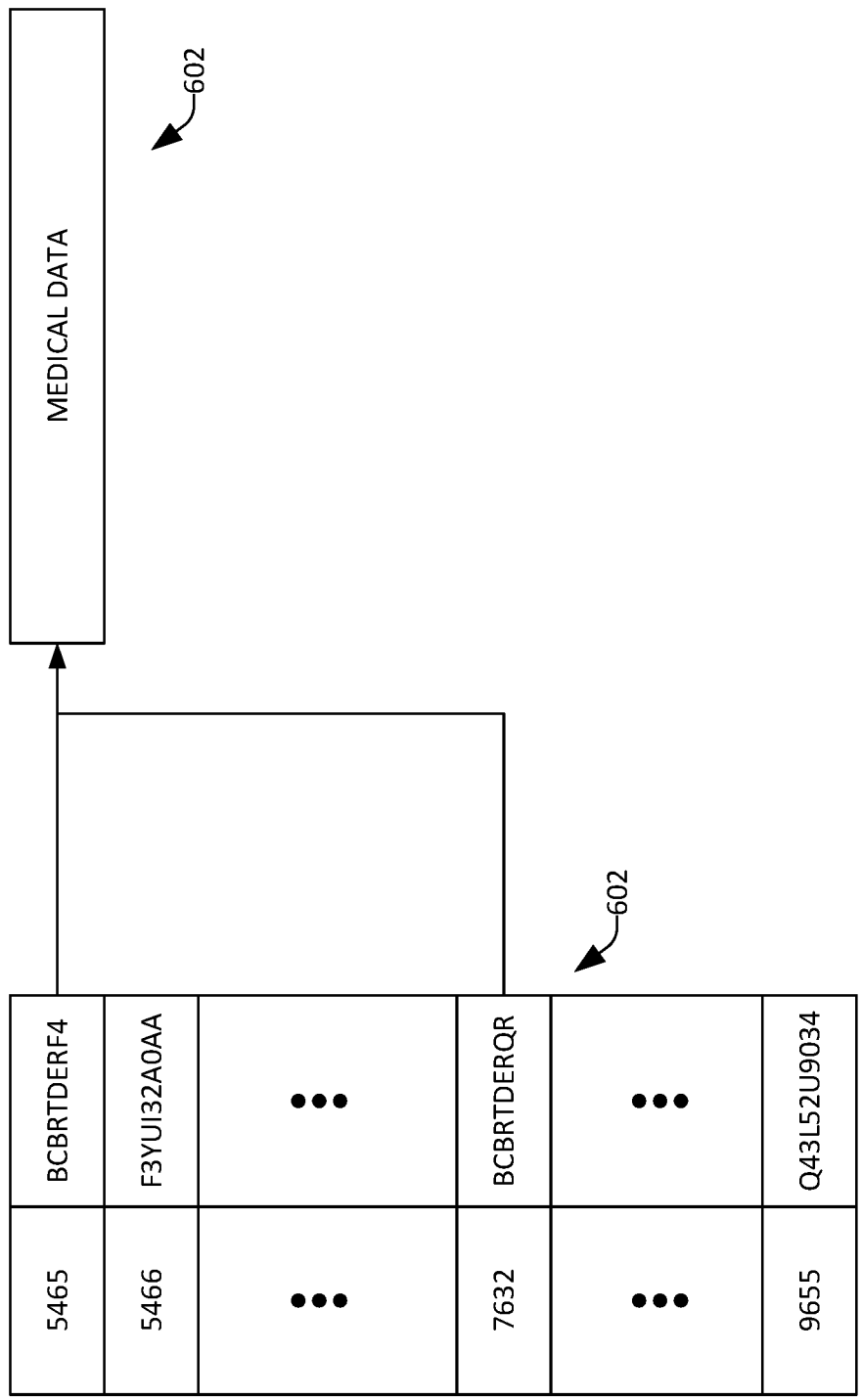
FIG. 6 is a schematic that depicts a signature for a patient being mapped to a medical record number for the patient, and the medical record number for the patient being mapped to medical data for the patient.

Now referring to FIG. 6, a schematic 600 that depicts an exemplary mapping between a signature corresponding to a patient and medical data 602 for the patient is illustrated. A table 604 comprises medical record numbers (MRNs) and signatures that are mapped to the MRNs. It can be understood that more than one signature may map to a single MRN. This may occur, for instance, if a patient changes his or her name. In an example, when the EHR 108 ascertains that the patient 134 is a new patient at the healthcare facility, the EHR 108 can automatically generate an MRN for the patient 134, wherein the MRN for the patient 134 is mapped to the medical data 602 for the patient 134. In the example shown in FIG. 6, the signature for the patient 134 (which is based upon PID of the patient 134) is mapped to the MRN for the patient, which in turn can point to the medical data 602 for the patient. Other approaches for mapping the signature to the medical data 602 for the patient are contemplated.

Returning to FIG. 1, the signature generator application 110, responsive to generating the signature for the patient 134, can discard the alphanumerical character string which includes the PID for the patient 134. Hence, the database 122 does not include the name of the patient 134, the SSN of the patient 134, or other PID for the patient 134. Thus, even if a malicious entity were able to acquire the database 122 (and assuming that the database 122 is not encrypted), the malicious entity would only be able to ascertain that some anonymous identity has certain medical data associated therewith. The malicious entity would not be able to ascertain any PID for patients who are represented by signatures in the database 122.

The EHR 108, however, is able to retrieve medical data for the patient 134 upon the patient returning to the healthcare facility. For example, two months after initially visiting the health care facility, the patient 134 can return for a follow-up appointment. The patient 134 can interact with the healthcare worker 132 (or directly with the client computing device 128) and can inform the healthcare worker 132 of appropriate PID for the patient 134 (e.g., name, SSN, etc.), which is employed by the signature generator application 110 to generate signatures. The healthcare worker 132 can enter such information into a graphical user interface presented on a display of the client computing device 128, and the client computing device 128 can transmit an alphanumerical character string (comprising the PID for the patient 134) by way of the network 130 to the server computing device 102. The EHR 108 receives the alphanumerical character string, and directs the alphanumerical character string to the signature generator application 110. The signature generator application 110 generates the signature, in the manner described above, and returns the signature to the EHR 108. The EHR 108 can then search the database 122 utilizing the signature 126, such that the medical data 124 for the patient 134 is retrieved by the EHR 108 (and at least a portion thereof is returned to client computing device 128 for review by the healthcare worker 132).

There are numerous advantages associated with the approach set forth herein compared to conventional approaches. As indicated previously, the database 122 need not retain any PID for the patient 134. Moreover, a malicious entity is unable to reverse the process described herein (even if the deterministic rules and the tables 112 were exposed the malicious entity), due to the removal of bits and the re-ordering of the bit sequences. Finally, the healthcare worker 132 can retrieve data about the patient 134 only upon the patient 134 providing PID to the healthcare worker 132 (or directly to the client computing device 128). Hence, the patient 134 need not be forced to remember a password to allow the healthcare worker 132 to retrieve the medical data 124 for the patient. The patient 134 need only remember information that most patients are likely to easily remember.

The system 100 is additionally flexible to allow for changes in PID. For instance, between visits, the name of the patient 134 may change. The patient 134 can set forth this new information by way of the client computing device 128, and the EHR 108 can operate as described above. When receiving the new signature for the patient 134, the EHR 108 can map this new signature to a pre-existing MRN in the table 604. Therefore, as noted above, it can be ascertained that multiple signatures for a patient can be mapped to a single MRN.

The system 100 may further be adapted to facilitate prevention of dictionary attacks when querying the database 122. For example, a malicious entity may attempt to query combinations of names, SSNs, and dates of birth, wherein if the medical data is retrieved for some combination, then the malicious entity can confirm that the guessed combination of PID matches an actual person. The signature generator application 110 can thwart this approach by generating signatures for "fake" patients each time that the signature generator application 110 generates a new signature for a new patient. That is, the first time that the signature generator application 110 generates the signature for the patient 134 using the alphanumerical character string that includes PID for the patient 134, the signature generator application 110 can generate several other signatures using "fake" patient PID. This can be accomplished, for instance, by mixing and matching names from a names database, such that PID of "fake" people is used to generate signatures. Therefore, in the unlikely event that a malicious entity were to guess PID for the patient 134 when querying the database 122, the malicious entity would not be able to ascertain whether the PID used to retrieve results maps to an actual person or a fake one generated by the signature generator application 110.

Still further, the signature generator application 110 can improve security by adding salts (in a deterministic manner) to alphanumerical character strings prior to generating the signature. For example, the signature generator application 110 can automatically add some number of digits assigned by or uniquely associated with a health care facility to the alphanumerical character string, such that the signature generator application 110 generates the signature for the patient 134 based upon the alphanumerical character string as well as the salt appended or prepended thereto. In yet another example, the patient 134 may be requested to provide a password, such that the signature generator application 110 generates the signature for the patient 134 based upon the PID and the password.

While the signature generator application 110 has been described as operating in a healthcare environment, it is to be understood that the signature generator application 110 is applicable to a wide variety of environments. For example, rather than maintaining a database of passwords and usernames that are encrypted, a database can include several signatures that are created based upon usernames and passwords. Again, the advantage of this approach is that if a malicious entity were to acquire the database, the malicious entity would be unable to ascertain the username and password. Further, while actions of the signature generator application 110 have been described above as being performed on the server computing device 102, it is to be understood that the signature generator application 110 may be installed and executed on the client computing device 128. Additionally, the signature generator application 110 can generate signatures for a legacy database, such that PID existent in a legacy database can be removed and replaced with signatures generated by the signature generator application (based upon the PID). Finally, several examples have been provided above with respect to a number of substrings from which an alphanumerical character string is partitioned, a number of alphanumerical characters in substrings, etc. It is to be understood that these are merely examples and that a wide variety of different approaches are contemplated.

Figure 7:
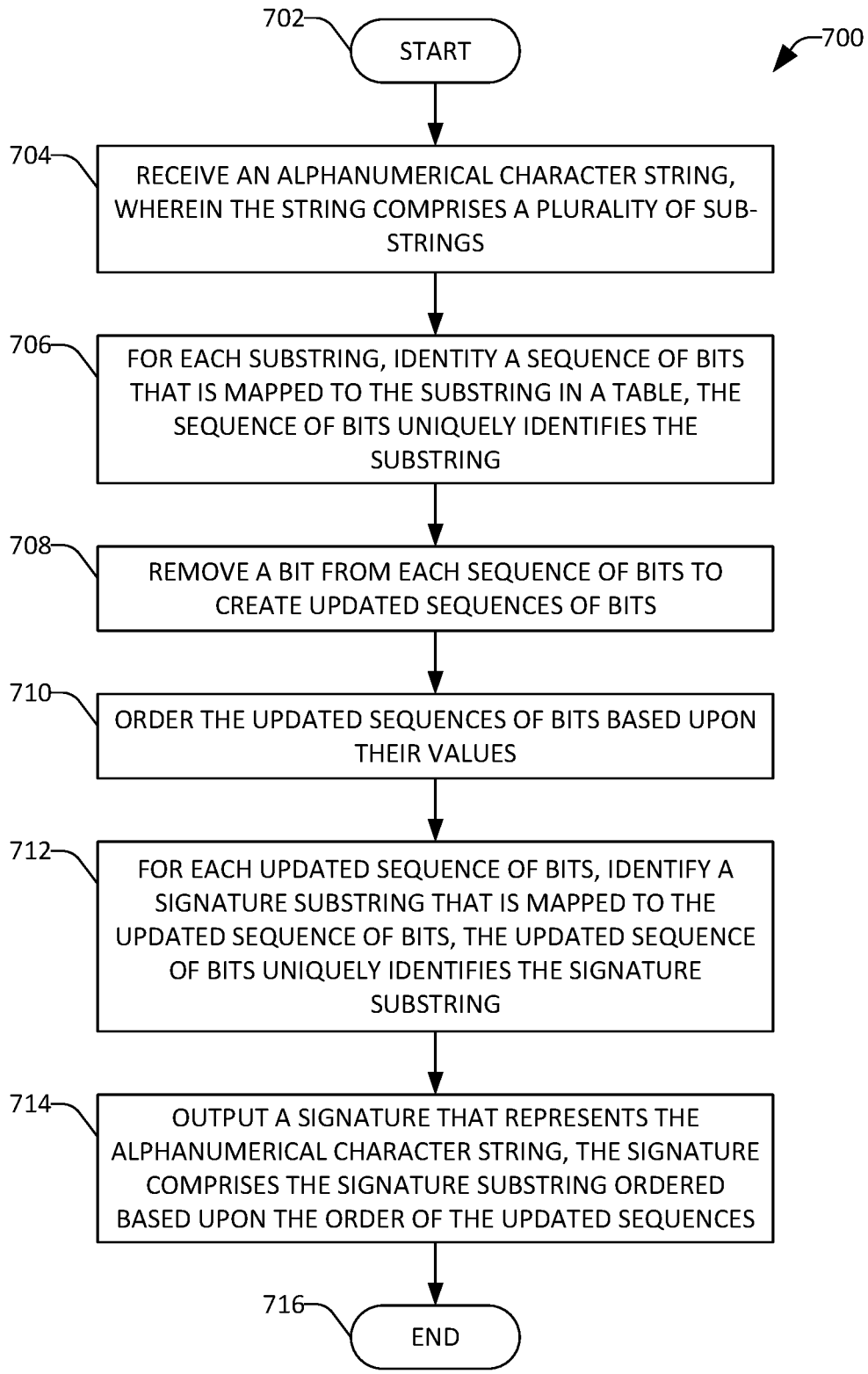
FIG. 7 is a flow diagram that illustrates an exemplary methodology for outputting a signature that represents an alphanumerical character string, wherein the alphanumerical character string comprises personally identifying data (PID) for a user.
Figure 8:
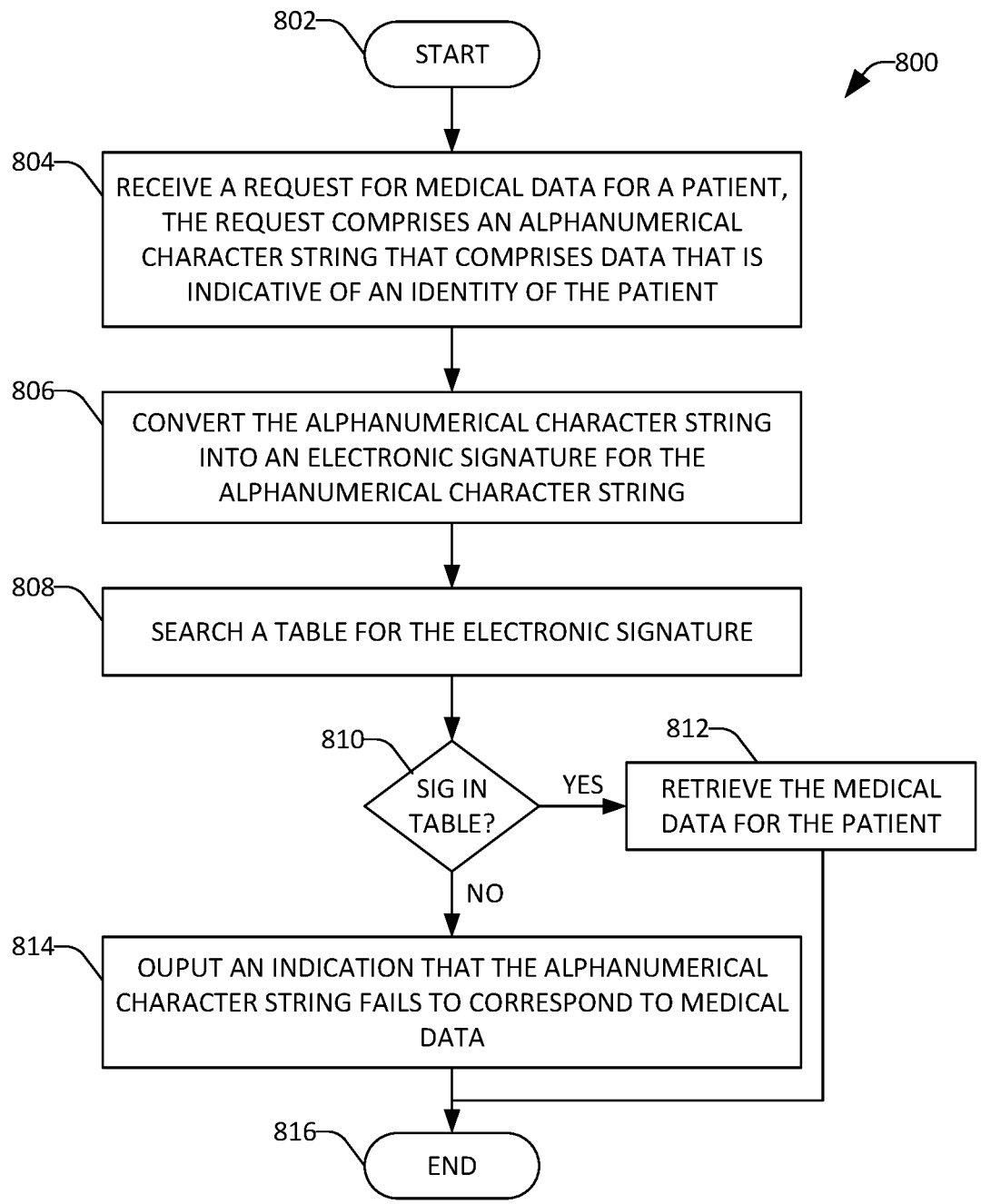
FIG. 8 is a flow diagram that illustrates an exemplary methodology for returning medical data for a patient responsive to searching a database using a signature for the patient.

FIGS. 7 and 8 illustrate exemplary methodologies relating to converting alphanumerical strings, which may comprise PID, into signatures that represent the alphanumerical strings. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 7, an exemplary methodology 700 that facilitates outputting a signature that represents an alphanumerical character string is illustrated. The methodology 700 starts at 702, and at 704, an alphanumerical character string is received, wherein such string comprises a plurality of substrings. In the example set forth above, the alphanumerical character string "JOHNSMITH" comprises substrings "JO", "HNS", "M", and "ITH". At 706, for each substring, a sequence of bits that is mapped to the substring in a mapping table is retrieved from the mapping table, wherein the sequence of bits mapped to the substring uniquely identifies the substring.

At 708, a bit is removed from each sequence of bits to create updated sequences of bits. Further, as indicated previously, the remaining bits are left in their original order. At 710, the updated sequences of bits are ordered based upon their values.

At 712, for each updated sequence of bits, a signature substring that is mapped to the updated sequence of bits is retrieved from the mapping table, wherein the updated sequence of bits uniquely identifies the signature substring. Referring again to the example set forth above, when a bit is removed from the sequence of bits that represents the substring "JO", the updated sequence of bits uniquely represents the signature substring "DER". At 714, a signature that represents the alphanumerical character string is output, wherein the signature comprises the signature substrings which are ordered based upon the order of the updated sequences of bits. As noted above, this signature can be used to index medical data for a patient, wherein the alphanumerical substring comprises PID for the patient. The methodology 700 completes at 716.

Now referring to FIG. 8, an exemplary methodology 800 that facilitates searching a database using a signature is illustrated. The methodology 800 starts at 802, and at 804, a request for medical data for a patient is received, wherein the request comprises an alphanumerical character string that comprises data that is indicative of an identity of the patient. As noted previously, this data may include a first and last name of the patient, a SSN for the patient, the data birth of the patient, and/or other suitable data. At 806, the alphanumerical character string is converted into an electronic signature for the alphanumerical character string (as described with respect to FIG. 7). At 808, a table is searched over for the electronic signature. At 810, a determination is made as to whether the signature is included in the table. At 812, when the signature is included in the table, medical data for the patient is retrieved and returned to the issuer of the query. When, however, at 810, it is determined that the signature is not in the table, an output is generated that indicates that there is no medical data in the database that corresponds to the alphanumerical character string. The methodology 800 completes at 816.

Figure 9:
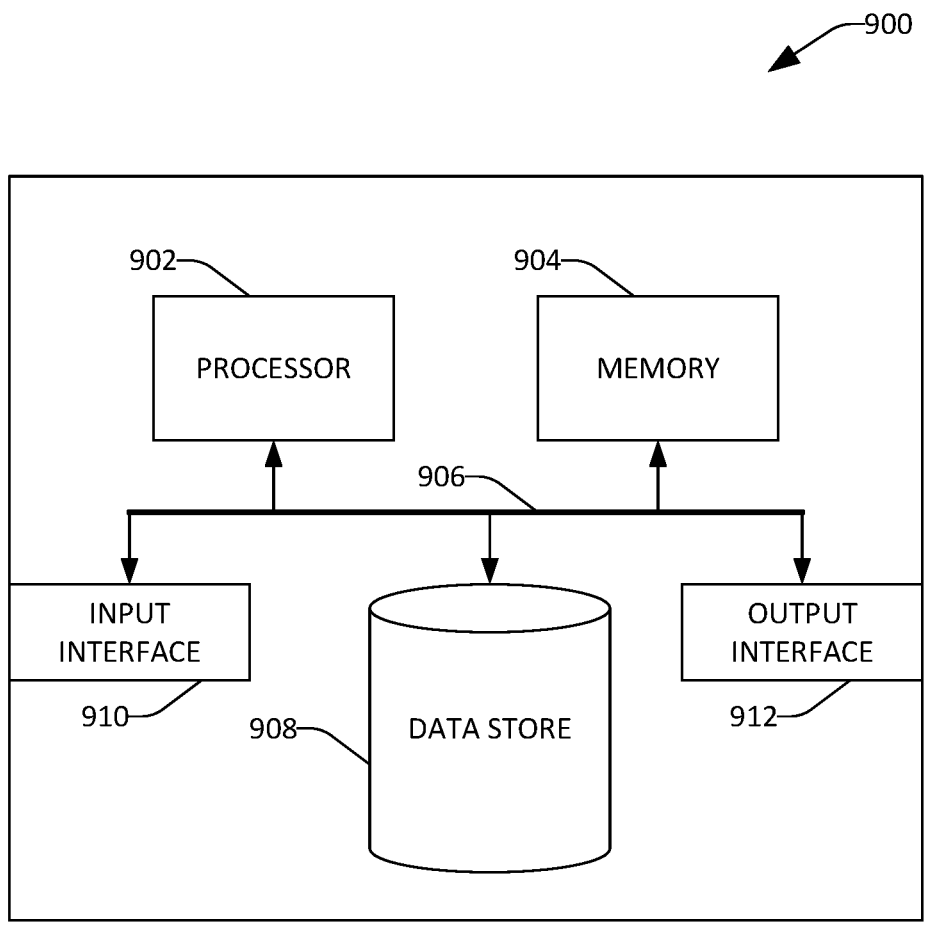
FIG. 9 is a schematic of an exemplary computing device.

Referring now to FIG. 9, a high-level illustration of an exemplary computing device 900 that can be used in accordance with the systems and methodologies disclosed herein is illustrated. For instance, the computing device 900 may be used in a system that supports converting an alphanumerical character string into a signature for the string. By way of another example, the computing device 900 can be used in a system that supports searching a database using the signature. The computing device 900 includes at least one processor 902 that executes instructions that are stored in memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store medical data, signatures, MRNs, etc.

The computing device 900 additionally includes a data store 908 that is accessible by the processor 902 by way of the system bus 906. The data store 908 may include executable instructions, signatures, MRNs, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
 a processor; and
 memory storing instructions that, when executed by the processor, cause the processor to perform acts comprising:
  receiving an alphanumerical character string, the alphanumerical character string comprises data that is indicative of an identity of a patient;
  responsive to receiving the alphanumerical character string, partitioning the alphanumerical character string into multiple substrings, wherein a first substring in the multiple substrings comprises a first number of alphanumerical characters, and a second substring in the multiple substrings comprises a second number of alphanumerical characters;
  for the first substring in the multiple substrings, identifying a sequence of bits that is uniquely mapped to the first substring in a mapping table;
  removing at least one bit from the sequence of bits to create an updated sequence of bits, wherein bits other than the removed at least one bit are retained in the updated sequence of bits;
  identifying a third substring based upon the updated sequence of bits, wherein the third substring is uniquely mapped to the updated sequence of bits in the mapping table;
  including the third substring in a signature for the alphanumerical substring;
  associating, in a database, medical data of the patient with the signature, wherein the medical data for the patient is associated with the signature rather than the alphanumerical character string;
  receiving a request to retrieve the medical data for the patient, the request comprises the alphanumerical character string;
  responsive to receiving the request, converting the alphanumerical character string into the signature; and retrieving the medical data of the patient responsive to converting the alphanumerical character string into the signature.

2. The computing system of claim 1, wherein the alphanumerical character string comprises a name of the patient and a date of birth of the patient.

3. The computing system of claim 1, wherein partitioning the alphanumerical character string into the multiple substrings comprises:
identifying a number of characters in the alphanumerical character string;
identifying a partition rule from a partition table based upon the number of characters in the alphanumerical character string; and
partitioning the alphanumerical character string into the multiple substrings based upon the partition rule, wherein the partition rule defines a number of substrings in the multiple substrings and a number of alphanumerical characters in each substring of the multiple substrings.

4. The computing system of claim 3, wherein the number of alphanumerical characters in any of the multiple substrings is one alphanumerical character, two alphanumerical characters, or three alphanumerical characters.

5. The computing system of claim 1, the acts further comprising:
repeating, for each substring in the multiple substrings, the acts of identifying, removing, identifying, and including.

6. The computing system of claim 5, wherein the signature comprises second multiple substrings, the acts further comprising:
prior to including the second multiple substrings in the signature, reordering the second multiple substrings based upon locations of each substring in the second multiple substrings in the mapping table, wherein a sequence of substrings in the signature is different from a sequence of the corresponding substrings in the alphanumerical character string.

7. The computing system of claim 1, wherein an electronic health record application (EHR) is configured to perform the acts when the processor executes the EHR.

8. A method executed at a server computing device, the method comprising:
receiving, by a processor of the server computing device, an alphanumerical character string, the alphanumerical character string comprises data that is indicative of an identity of a patient;
generating, by the processor, a signature for the alphanumerical character string, wherein generating the signature comprises:
partitioning the alphanumerical character string into a several substrings, wherein a first substring in the several substrings comprises a first number of alphanumerical characters, and a second substring in the several substrings comprises a second number of alphanumerical characters;
for the first substring in the multiple substrings, retrieving a sequence of bits from a mapping table, the sequence of bits is uniquely mapped to the first substring in the mapping table;
forming an updated sequence of bits from the sequence of bits, wherein forming the updated sequence of bits comprises removing at least one bit from the sequence of bits while retaining an order of remaining bits in the sequence of bits;

responsive to forming the updated sequence of bits, retrieving a third substring from the mapping table, the third substring uniquely mapped to the updated sequence of bits in the mapping table, wherein the third substring is included as a portion of the signature;
mapping, by the processor, the signature to medical data of the patient in a database;
subsequent to mapping the signature to the medical data of the patient in the database, receiving, by the processor, a request to retrieve the medical data of the patient, the request comprises the alphanumerical character string;
responsive to receiving the request, converting, by the processor, the alphanumerical character string into a second signature;
identifying, by the processor, that the second signature matches the signature in the database; and
retrieving, by the processor, the medical data from the database based upon the second signature matching the signature.

9. The method of claim 8, wherein generating the signature further comprises:
prior to partitioning the alphanumerical character string into the several substrings:
identifying a number of alphanumerical characters in the alphanumerical character string; and
determining a number of substrings into which the alphanumerical character string is to be partitioned based upon the number of alphanumerical characters in the alphanumerical character string, wherein the alphanumerical character string is partitioned into the number of substrings.

10. The method of claim 9, wherein generating the substring further comprises:
prior to partitioning the alphanumerical character string into the several substrings: determining, for each substring into which the alphanumerical character string is to be partitioned, a number of alphanumerical characters that are to be included in the substring, wherein the alphanumerical character string is partitioned based upon the number of alphanumerical characters that are to be included in the substring.

11. The method of claim 8, wherein generating the signature further comprises:
for each substring in the several substrings:
retrieving a respective sequence of bits from the mapping table, the respective sequence of bits is uniquely mapped to the respective substring in the mapping table;
forming a respective updated sequence of bits from the respective sequence of bits, wherein forming the respective updated sequence of bits comprises removing at least one bit from the respective sequence of bits while retaining an order of remaining bits in the respective sequence of bits; and
responsive to forming the respective updated sequence of bits, retrieving a respective fourth substring from the mapping table, the respective fourth substring uniquely mapped to the respective updated sequence of bits in the mapping table, wherein each fourth substring is included in the signature.

12. The method of claim 11, wherein generating the signature further comprises:
ordering the updated sequences of bits based upon their values, wherein an order of the fourth substrings in the signature corresponds to the ordering of the updated sequence of bits.

13. The method of claim 8, wherein the first substring consists of a first number of alphanumerical characters, and the third substring consists of a second number of alphanumerical characters that is different from the first number of alphanumerical characters.

14. The method of claim 13, wherein the second number of alphanumerical characters is greater than the first number of alphanumerical characters.

15. The method of claim 8, further comprising:
- responsive to receiving the alphanumerical character string, automatically creating a second alphanumerical character string;
- generating a third signature for the second alphanumerical character string; and
- including the third signature in the database.

16. The method of claim 8, wherein the alphanumerical character string is received from a computing device that executes an electronic health record application (EHR).

17. A computer-readable storage medium comprising instructions that, when executed by a processor, cause the processor to perform acts comprising:
- receiving an alphanumerical character string, the alphanumerical character string comprises data that is indicative of an identity of a patient;
- generating a signature for the alphanumerical character string, wherein generating the signature comprises:
  - partitioning the alphanumerical character string into a several substrings, wherein a first substring in the several substrings comprises a first number of alphanumerical characters, and a second substring in the several substrings comprises a second number of alphanumerical characters;
  - for the first substring in the several substrings, retrieving a sequence of bits from a mapping table, the sequence of bits is uniquely mapped to the first substring in the mapping table;
  - forming an updated sequence of bits from the sequence of bits, wherein forming the updated sequence of bits comprises removing at least one bit from the sequence of bits while retaining an order of remaining bits in the sequence of bits; and
  - responsive to forming the updated sequence of bits, retrieving a third substring from the mapping table, the third substring uniquely mapped to the updated sequence of bits in the mapping table, wherein the third substring is included as a portion of the signature; and
- mapping the signature to medical data of the patient in a database, wherein the medical data is retrievable from the database when a query executed over the database comprises the signature.

* * * * *